United States Patent [19]

Ohmae et al.

[11] Patent Number: 5,292,803
[45] Date of Patent: Mar. 8, 1994

[54] PROCESS FOR THE PRODUCTION OF POLYMERIC POLYOLS

[75] Inventors: Tadayuki Ohmae, Chiba; Hisao Tanaka, Ichihara; Sumio Hara, Sodegaura; Kenzo Chikanari, Ichihara, all of Japan

[73] Assignee: Sumitomo Chemical Company, Limited, Osaka, Japan

[21] Appl. No.: 957,008

[22] Filed: Oct. 6, 1992

[51] Int. Cl.$^5$ ............................................ C08F 8/00
[52] U.S. Cl. ....................................... 525/61; 525/56; 525/58
[58] Field of Search ....................... 525/61, 58, 56

[56] References Cited

U.S. PATENT DOCUMENTS 2,434,179 12/1931 Sharkey .
4,611,029 9/1986 Takahashi ........................... 525/61

FOREIGN PATENT DOCUMENTS 52-17558 5/1977 Japan .

OTHER PUBLICATIONS

*Journal of Polymer Science: Polymer Physics Edition*, Solution Behavior of *Ethylene-co-Vinyl Alcohol)-g-Ethylene Oxide]* Graft Copolymers, Ryuichi Endo et al., vol. 17, 645-654, 1979.
*Kobunshi Ronbunshu*, vol. 36, No. 7, pp. 489-494, Jul. 1979.

Primary Examiner—James J. Seidleck
Assistant Examiner—Mark Warzel
Attorney, Agent, or Firm—Sughrue, Mion, Zinn, Macpeak & Seas

[57] ABSTRACT

There is disclosed a process for the production of polymeric polyols, which comprises the steps of:

partially or completely saponifying a heterogeous two-phase mixture of (a) a heated molten liquid containing an ethylene-saturated carboxylic acid vinyl ester copolymer having a number average molecular weight of from 800 to 5000 and a saturated carboxylic acid vinyl ester content of from 1 to 50% by weight, and (b) an aliphatic alcohol, in the presence of an alkali catalyst, while removing a saturated carboxylic acid alkyl ester byproduct from the reaction system;

then removing the residual aliphatic alcohol from the reaction system; and supplying an alkylene oxide to effect an alkylene oxide-addition reaction, optionally after further supplying the alkali catalyst.

8 Claims, No Drawings

PROCESS FOR THE PRODUCTION OF POLYMERIC POLYOLS

BACKGROUND OF THE INVENTION

The present invention relates to a process for the production of polymeric polyols which comprises the steps of saponifying low molecular weight ethylenesaturated carboxylic acid vinyl ester copolymers, and then carrying out an alkylene oxide-addition operation. More specifically, the invention relates to a process for producing polymeric polyols which are useful as starting materials in the production of synthetic resins, for instance, as polyol components of saturated polyesters, polyurethanes and the like, and as additives, including bloom inhibitors for synthetic rubbers such as SBR (styrene-butadiene rubber), NBR (acrylonitrile-butadiene rubber), CR (chroloprene rubber), EPDM (ethylene-propylene-diene terpolymer), etc., antistatic agents, antifogging agents, lubricants, and workability improvers, for synthetic resins such as polyethylenes, polypropylenes and the like, and also as polymeric solid electrolytes, wax modifiers, bonding agents for inorganic materials, and the like.

Saponification products of ethylene-saturated carboxylic acid vinyl ester copolymers are known, and polymeric polyols, which have been produced by an alkylene oxide-addition reaction of such saponification products, are also known.

For instance, Japanese Patent Specification KOKOKU No. Sho 52-17558 (1977) discloses a process for the saponification of ethylene-saturated carboxylic acid vinyl ester copolymers, wherein a low molecular weight ethylene-vinyl ester copolymer, having a molecular weight of from 800 to 4000, is dissolved in a solvent such as xylene, and the resulting solution is saponified with the aid of methanol and catalysts in an autoclave or tower type reactor to form a glossy wax product.

U.S. Pat. No. 2,434,179 discloses a process for producing polymeric polyols by adding an alkylene oxide to a saponification product of ethylene-saturated carboxylic acid vinyl ester copolymers, wherein an alkylene oxide such as ethylene oxide is added to a saponification product of ethylenevinyl acetate copolymers having an ethylene/vinyl acetate molar ratio of from 1/25 to 8/1.

However, the known methods mentioned above comprise independently effecting the saponification and the alkylene oxide-addition. So, these methods are not highly effective and not economical for the production of polymeric polyols by saponifying a starting ethylene-saturated carboxylic acid copolymer and then by effecting an alkylene oxide-addition reaction. Further, the known processes require the use of a large amount of alkali catalysts, so that the resultant polymeric polyols have an undesirably high alkali residue content. Such polyols are not suitable for use in certain fields.

Japanese Patent Specification KOKOKU No. Sho 52-17558 (1977) discloses a process for the saponification of ethylene-saturated carboxylic acid vinyl ester copolymers, wherein the saponification reaction is carried out in a solution of the reactant in an organic solvent such as xylene having a concentration of up to 60% by weight. So, in this process, it is a serious problem to recover the solvent used.

Alkali catalysts are effective in each of the saponification reaction and the alkylene oxide-addition reaction. However, if one kind of alkali catalyst is used in both the saponification reaction and the alkylen oxide-addition reaction, it will be observed that the reaction velocity of any one of these two reactions will be undesirably low. To eliminate this drawback, it is necessary to use such a catalyst in a large amount. As a result of this, the polymeric polyol products will have a high alkali salt residue content, and it is very difficult to remove the alkali salt residues.

SUMMARY OF THE INVENTION

It is therefore an object of the invention to provide a very simple process for the production of polymeric polyols, wherein an ethylene-saturated carboxylic acid vinyl ester copolymer is saponified, and then an alkylene oxide-addition reaction is carried out to obtain the aimed polymeric polyol product having a low alkali residue content.

In order to solve the above-mentioned problems, we have made many studies and hence completed the invention. According to the invention, the saponification step and the alkylene oxide-addition step are consecutively carried out under such a condition that ethylene-saturated carboxylic acid vinyl ester copolymers are handled as a heated flowable molten liquid, and therefore this process is satisfactorily simple. Further, a proper use is made of alkali catalysts in each of the saponification step and the alkylene oxide-addition step, and therefore the total amount of the catalysts used is appreciably low, so that the resulting polymeric polyol product will have a low alkali residue content.

According to the invention, there is provided a process for the production of polymeric polyols, which comprises the steps of:

partially or completely saponifying a two-phase heterogeneous mixture of (a) a heated molten liquid containing an ethylene-saturated carboxylic acid vinyl ester copolymer having a number average molecular weight of from 800 to 5000 and a saturated carboxylic acid vinyl ester content of from 1 to 50% by weight, and (b) an aliphatic alcohol, in the presence of an alkali catalyst, while removing a saturated carboxylic acid alkyl ester byproduct from the reaction system;

then removing the residual alcohol from the reaction system; and supplying an alkylene oxide to effect an addition-reaction, optionally after further supplying the alkali catalyst.

Preferably, the saturated carboxylic acid vinyl ester is vinyl acetate, the aliphatic alcohol is methyl alcohol, the alkali catalyst comprises sodium hydroxide and/or potassium hydroxide, the alkylene oxide is ethylene oxide, and use is made of an ethylene-vinyl acetate copolymer having a number average molecular weight of from 1000 to 4000 and a vinyl acetate content of from 10 to 40% by weight.

DETAILED DESCRIPTION OF THE INVENTION

In carrying out the invention, use is made of ethylene-saturated carboxylic acid vinyl ester copolymers having a number average molecular weight of from 800 to 5000 and a saturated carboxylic acid vinyl ester content of from 1 to 50% by weight. These copolymers may be easily prepared in a known manner, for instance, by a solution or gaseous phase radical polymerization method as disclosed in Japanese Patent Specifications KOKOKU Nos. Sho 43-16775 (1968), Sho 60-33154

(1985), etc. Preferred copolymers are ethylene-vinyl acetate copolymers having a number average molecular weight of from 1000 to 4000 and a vinyl acetate content of from 10 to 40% by weight, because they are easily available in markets, and their use results in the production of polymeric polyols having good properties.

Aliphatic alcohols used according to the invention are preferably those having the general formula:

R—OH wherein R represents alkyl. Examples of such alcohols are lower alcohols containing 1 to 4 carbon atoms, such as methyl alcohol, ethyl alcohol, propyl alcohol, butyl alcohol and the like. Methyl alcohol is especially preferred, in view of the reaction velocity of the saponification reaction and of the vapor recovery efficiency after the reaction.

As examples of alkylene oxides employed according to the invention, there may be mentioned alkylene oxides having 2 to 3 carbon atoms, such as ethylene oxide, propylene oxide and the like. Ethylene oxide is particularly preferred, because its use results in the production of polymeric polyols having good properties.

It is well known that alkali catalysts are effective in a process, wherein ethylene-saturated carboxylic acid vinyl esters copolymers are saponified, and then an alkylene oxide-addition reaction is carried out. Representative examples of alkali catalysts include hydroxides and alcolates of alkali metals. As a result of various studies about alkali catalysts, it has been found to be especially preferred in the case of the present invention that sodium hydroxide should be used i the saponification step, and that potassium hydroxide should be used in the alkylene oxide-addition step, for the reason that the alkali residue content of polymeric polyols may greatly be reduced.

The saponification reactions according to the invention may be carried out batchwise or continuously. The reaction may be effected by heating a mixture of ethylene-saturated carboxylic acid vinyl ester copolymers, aliphatic alcohols and alkali catalysts.

In the saponification reactions, a saponification product is produced together with a saturated carboxylic acid alkyl ester byproduct. Unless the byproduct is removed from the reaction system, there may be a decrease of the catalyst efficiency. Particularly, it is noted that the catalyst efficiency decreases when there are salts formed by the conversion of alkali catalysts. It is therefore preferred to remove the byproduct from the reaction system under conditions suitable for the evaporation of aliphatic alcohols.

After the completion of the saponification reactions, the temperature of the reaction mixture is increased in order to completely remove the aliphatic alcohols and the saturated carboxylic acid alkyl ester byproducts from the reaction system. In this manner, it is possible to completely remove aliphatic alcohols which would be harmful in the next alkylene oxide-addition step.

The saponification products of ethylene-saturated carboxylic acid vinyl ester copolymers thus obtained are then optionally admixed with a further amount of alkali catalysts. Furthermore, alkylene oxides are supplied at a high temperature to produce polymeric polyols.

There is no specific limitation on the saponification rate of ethylene-saturated carboxylic acid vinyl ester copolymers, although it is preferred that the saponification rate should be in the range of from 50 to 100%, in view of the properties of the final polymeric polyol products.

Further, there is no limitation on the amount of alkylene oxides supplied. It is preferred to use 20 to 1000 parts by weight of alkylene oxides per 100 parts by weight of the saponification products of ethylenesaturated carboxylic acid vinyl ester copolymers, in order to produce the final polymeric polyol products having good properties.

It is economical to carry out both the saponification reactions and the alkylene oxide-addition reactions in the same reactor. In other words, it will be result in a considerable decrease of the operational efficiency to carry out a work for taking out the saponification reaction products from the reactor.

The saponification reactions may be effected by carrying out a mixing operation for several hours at the boiling points of aliphatic alcohols under atmospheric pressure. The alkylene oxide-addition reactions may be effected by carrying out a mixing operation at a temperature of from 100° to 200° C. under a pressure of from 1 to 9 atm for several hours.

In the saponification step of the present process, it is preferred to use aliphatic alcohols and alkali catalysts as small as possible, in view of economy and of a possible reduction of alkali residue content of the resultant products. However, if the amount used is excessively small, then the reaction velocity will be undesirably low, and a satisfactory saponification will not be accomplished. It is desirable to use 20 to 1000 parts by weight, preferably 100 to 500 parts by weight of aliphatic alcohols, and 0.01 to 2 parts by weight, preferably 0.1 to 1 part by weight of alkali catalysts per 100 parts by weight of ethylene-saturated carboxylic acid vinyl ester copolymers.

In the saponification step, alkali catalysts may be supplied portionwise or in one time.

In the alkylene oxide-addition step, it is advantageous that the amount of alkali catalysts used should be as small as possible, in view of economy and of a possible decrease of alkali residue content of the resultant products. However, if the amount used is excessively small, then the reaction velocity will be undesirably low and the addition reactions will not satisfactorily proceed. It is desirable to use 0.01 to 2% by weight, preferably 0.1 to 1% by weight of alkali catalysts per 100 parts by weight of saponification products of ethylene-saturated carboxylic acid vinyl ester copolymers. The alkali catalysts may be supplied portionwise or in one time.

According to the invention as mentioned above, the molten polymers are effectively saponified in the presence of alcohols and alkali catalysts without using any organic solvents while removing the byproducts and excessive alcohols. Then the resulting saponification products are subjected to the alkylene oxide-addition reactions without taking out the saponification products from the reactor. After optionally supplying a further amount of alkali catalysts, the alkylene oxide-addition reactions are effected, whereby the aimed polymeric polyols, having a reduced alkali residue content, can effectively and economically be produced.

In the saponification step, the starting ethylene-saturated carboxylic acid vinyl ester copolymers are wholly or partially converted, depending on the saponification rate, to ones having a vinyl alcohol structure. A completely saponified product will have a structure of ethylene-vinyl alcohol copolymer.

The products of the alkylene oxide-addition step as the second step have a structure containing the alkylene oxide components inserted into the vinyl alcohol components. Depending on the amount of alkylene oxide used, the addition products will have a structure, wherein there are chains consisting of several alkylene oxide segments or consisting of scores of such segments, and there are hydroxyl groups at the terminals of molecules. Therefore, the polymeric polyols according to the invention can be used, for instance, as starting materials in the production of condensation polymer type resins, and also as various additives, aids for modifications, binders and the like.

DESCRIPTION OF PREFERRED EMBODIMENT OF THE INVENTION

The invention will be further illustrated in detail by the Examples. However, it should be noted that the scope of the invention is not restricted only to the Examples.

REFERENCE EXAMPLE

Production of ethylene-vinyl acetate copolymer

In a high pressure reactor, ethylene was copolymerized with vinyl acetate in the presence of t-butyl peroxy-2-ethyl hexanoate as polymerization initiator and also in the presence of propane as molecular weight modifier at a temperature of 190° C. under a pressure of 1400 kg/cm$^2$ to produce an ethylene-vinyl acetate copolymer (hereinafter referred to as EVA) having a vinyl acetate content of 31% by weight, a number average molecular weight of 1800, and a softening point of 30° C.

EXAMPLE 1

A stainless autoclave, having a volume of 1 liter and provided with a stirrer, a withdrawal line and a feed line, was charged with 100 g of EVA as shown in the Reference Example, 200 g of methyl alcohol and 0.6 g of sodium hydroxide. The autoclave was heated to 65° C. under stirring while keeping the withdrawal line open, to effect the reaction for 2 hours. Thereafter, the temperature was raised to 140° C. over 1 hour to remove all of volatile matters from the reaction system. The resultant saponification product was waxy and had a melting point of 85° C. The saponification rate was 92%.

Next, 0.17 g of potassium hydroxide was added, the temperature was raised to 180° C., and ethylene oxide was added so as to reach a pressure of 2 kg/cm$^2$. A pressure drop due to the ethylene oxide-addition reaction was confirmed, and thereafter a further amount of ethylene oxide was intermittently supplied so as to maintain a pressure of 2 kg/cm$^2$. The total amount of ethylene oxide supplied during 1 hour was 170 g. When the pressure had decreased to 0.5 kg/cm$^2$, the temperature was decreased to 100° C., and the product was recovered. The aimed polymeric polyol was obtained in an amount of 250 g, and had a melting point of 52° C. and a hydroxyl value of 102 mg KOH/g.

By an analysis of the alkali metal content, it was found that the amounts of sodium and potassium were 1200 ppm and 300 ppm, respectively.

EXAMPLE 2

A stainless autoclave, having a volume of 700 liters and provided with a stirrer, a withdrawal line and a feed line, was charged with 160 kg of EVA as shown in the Reference Example, 320 kg of methyl alcohol and 0.96 kg of sodium hydroxide. The autoclave was heated to 65° C. under stirring while keeping the withdrawal line open, to effect a reaction for 2 hours. Thereafter, the temperature of the reaction mixture was raised to 142° C. over 1 hour to remove all of volatile matters from the reaction system. The resulting saponification product was waxy and had a melting point of 83° C. The saponification rate was 90%.

Thereafter, 0.27 g of potassium hydroxide was added, the temperature was raised to 180° C., and then ethylene oxide was supplied so as to reach a pressure of 2 kg/cm$^2$. After a pressure drop due to an ethylene oxide-addition reaction had been confirmed, a further amount of ethylene oxide was intermittently supplied so as to keep a pressure of 2 kg/cm$^2$. Namely, ethylene oxide was supplied in a total amount of 272 kg for the period of time of 1 hour. When the pressure had decreased to 0.4 kg/cm$^2$, the temperature was decreased to 100° C., and the product thus formed was recovered. 408 kg of polymeric polyol were obtained. The polymeric polyol had a melting point of 51° C. and a hydroxyl value of 110 mg KOH/g.

An analysis of alkali metals was made, and it was found that the amounts of sodium and potassium were 1200 ppm and 300 ppm, respectively.

EXAMPLE 3

An autoclave as shown in Example 1, having a volume of 1 liter, was charged with 100 g of EVA, 100 g of methyl alcohol and 0.3 g of sodium hydroxide. The autoclave was heated to 65° C. for 2 hour, while further supplying 100 g of methyl alcohol which contained 0.3 g of sodium hydroxide over 2 hours, with the proviso that the withdrawal line was kept open. Thereafter, the temperature was raised to 140° C. over 1 hour to remove all of volatile matters from the reaction system. A saponification product, having a melting point of 87° C., was obtained. The saponification rate was 94%.

Thereafter, 0.17 g of potassium hydroxide was added, the temperature was raised to 180° C., and then ethylene oxide was supplied so as to reach a pressure of 2 kg/cm$^2$. After a pressure drop due to an ethylene oxide-addition reaction and been confirmed, a further amount of ethylene oxide was intermittently supplied so as to maintain a pressure of 2 kg/cm$^2$. Namely, ethylene oxide was supplied in a total amount of 170 g over 1 hour. When the pressure had decreased to 0.5 kg/cm$^2$, the temperature was decreased to 100° C., and the product thus formed was recovered. 251 g of polymeric polyol were obtained. The polymeric polyol had a melting point of 50° C. and a hydroxide value of 105 mg KOH/g.

The analytical data of alkali metals showed that the amounts of sodium and potassium were 1200 ppm and 300 ppm, respectively.

EXAMPLE 4

An autoclave as shown in Example 2, having a volume of 700 liters, was charged with 100 kg of EVA as shown in the Reference Example, 320 kg of methyl alcohol and 1.96 kg of potassium hydroxide, and a reaction operation was carried out in a manner similar to that of Example 2.

A waxy saponification product, having a melting point of 80° C., was obtained at a saponification rate of 88%.

After that, any further amount of alkali was not supplied. Ethylene oxide was intermittently supplied so as to reach a pressure of 2 kg/cm². Namely, ethylene oxide was supplied in a total amount of 170 kg over 2 hours to effect a reaction. As a result of this, 253 kg of polymeric polyol, having a melting point of 38° C. and a hydroxyl value of 102 mg KOH/g, were obtained. Analytical data showed that the amount of potassium was 4000 ppm.

EXAMPLE 5

A 1-liter autoclave as shown in Example 1 was charged with 100 g of EVA as shown in the Reference Example, 200 g of methyl alcohol and 0.6 g of sodium hydroxide. A reaction operation was carried out in a manner similar to that of Example 1, to obtain a saponification product having a melting point of 85° C., at a saponification rate of 92%.

Then ethylene oxide was supplied at 180° C. to effect an ethylene oxide-addition reaction. The amount of ethylene oxide supplied over 3 hours was 48 g. Next, the aimed product was recovered. 134 g of polymeric polyol, containing 2600 ppm of sodium, were obtained.

EXAMPLE 6

A 1-liter autoclave as shown in Example 1 was charged with 100 g of EVA as shown in the Reference Example, 200 g of methyl alcohol and 0.6 g of sodium hydroxide. A reaction operation was carried out in a manner similar to that of Example 1, to obtain a saponification product having a melting point of 85° C., at a saponification rate of 92%.

Then, 0.3 g of sodium hydroxide was added, and ethylene oxide was supplied to effect an ethylene oxideaddition reaction. The total amount of ethylene oxide supplied over 3 hours was 64 g.

Next, the aimed product was recovered. 143 g of polymeric polyol, containing 3500 ppm of sodium, were obtained.

USE EXAMPLES

Antistatic Treatment of Sheet 100 parts by weight of ethylene-vinyl acetate copolymer resin ("Evatate H 2020", manufactured by Sumitomo Chemical) were admixed with 2 parts by weight of polymeric polyol prepared in Example 2, and the resulting mixture was kneaded and subjected to a compression molding operation under heating, to form a sheet having a thickness of 0.5 mm. Furthermore, another sheet was prepared without using the polymeric polyol.

These sheets were stored at a temperature of 23° C. and at a humidity of 50% for 30 hours, and then measurements were made about the surface resistivity of the sheets by means of a high resistance measurement apparatus. The sheet, not containing the polymeric polyol, had a resistance of at least $10^{16}$ ohms, whereas the sheet, containing the polymeric polyol, had a resistance of $10^{12}$ ohms. Thus, it was observed that the polymeric polyol had an antistatic effect.

Bloom-inhibiting Treatment of Rubber 100 parts by weight of ethylene-propylene-diene rubber ("Esprene 524", manufactured by Sumitomo Chemical) were kneaded together with 100 parts by weight of 65 carbon black, 30 parts by weight of process oil, 5 parts by weight of zinc oxide, 1 part by weight of stearic acid and 3 parts by weight of lubricant. Then, Soxinol ®

BZ, TT, TRA and DM (vulcanizing accelerators, mfd. by Sumitomo Chemical Co., Ltd.) were added in amounts of 2 parts, 0.5 part, 0.5 part and 1.0 parts by weight, respectively. Furthermore, 2 parts by weight of polymeric polyol prepared in Example 2 were added, and 1 part by weight of sulfur was added. The resultant mixture was subjected to a valcanization operation in a conventional manner to produce a sheet having a thickness of 2 mm. Further, another sheet, not containing the polymeric polyol, was prepared.

These sheets, initially having a similar luster, were stored at room temperature for 2 week, and then an observation was made about the luster of sheets. It was found that the sheet, containing the polymeric polyol, still held the initial luster, whereas the sheet, not containing the polymeric polyol, virtually lost the initial luster.

As explained above, the invention relates to a process for the production of polymeric polyols, which comprises the steps of:

partially or completely saponifying a heterogeous two-phase mixture of (a) a heated molten liquid consisting of an ethylene-saturated carboxylic acid vinyl ester copolymer having a number average molecular weight of from 800 to 5000 and a saturated carboxylic acid vinyl ester content of from 1 to 50% by weight, and (b) an aliphatic alcohol, in the presence of an alkali catalyst, while removing a saturated carboxylic acid alkyl ester byproduct from the reaction system;

then removing the residual aliphatic alcohol from the reaction system; and supplying an alkylene oxide to effect an alkylene oxide-addition reaction, optionally after further supplying the alkali catalyst.

According to the invention, the saponification step and the alkylene oxide-addition step are consecutively carried out. The saponification step is effected in a heterogeneous two-phase system containing a heated molten liquid and an aliphatic alcohol, while removing saturated carboxylic acid alkyl ester byproducts from the reaction system. Alkali catalysts are used under optimized conditions in the saponification step and the alkylene oxide-addition step so as to enhance the reactivity, whereby polymeric polyols, having a reduced alkali residue content, can be produced.

The polymeric polyols according to the invention are suitable for use as starting materials in the production of synthetic resins, and also as bloom inhibitors, antistatic agents, antifogging agents, lubricants, workability improvers, high molecular weight solid electrolytes, surface active agents, wax modifiers, binders for inorganic materials, etc. Thus, the polymeric polyols are highly valuable in the industrial fields.

We claim:

1. A process for the production of polymeric polyols, which comprises the steps of:

partially or completely saponifying a heterogeous two-phase mixture of (a) a heated molten liquid containing an ethylene-saturated carboxylic acid vinyl ester copolymer having a number average molecular weight of from 800 to 5000 and a saturated carboxylic acid vinyl ester content of from 1 to 50% by weight, and (b) an aliphatic alcohol, in the presence of an alkali catalyst, while removing a saturated carboxylic acid alkyl ester byproduct from the reaction system by increasing temperature;

then removing the residual aliphatic alcohol from the reaction system; and supplying an alkylene oxide to effect an alkylene oxide-addition reaction, optionally after further supplying the alkali catalyst.

2. A process for the production of polymeric polyols according to claim 1, wherein the saturated carboxylic acid vinyl ester is vinyl acetate.

3. A process for the production of polymeric polyols according to claim 1, wherein the aliphatic alcohol has the general formula:

R—OH wherein R represents alkyl.

4. A process for the production of polymeric polyols according to claim 3, wherein the aliphatic alcohol is methyl alcohol.

5. A process for the production of polymeric polyols according to claim 1, wherein the alkali catalyst comprises sodium hydroxide and/or potassium hydroxide.

6. A process for the production of polymeric polyols according to claim 1, wherein the alkylene oxide is ethylene oxide or propylene oxide.

7. A process for the production of polymeric polyols according to claim 6, wherein the alkylene oxide is ethylene oxide.

8. A process for the production of polymeric polyols according to claim 2, wherein the ethylene-vinyl acetate copolymer has a number average molecular weight of from 1000 to 4000 and a vinyl acetate content of from 10 to 40% by weight.

* * * * *